United States Patent [19]

Krounbi et al.

[11] Patent Number: 5,438,747

[45] Date of Patent: Aug. 8, 1995

[54] METHOD OF MAKING A THIN FILM MERGED MR HEAD WITH ALIGNED POLE TIPS

[75] Inventors: Mohamad T. Krounbi; Jyh-Shuey J. Lo, both of San Jose; Ching H. Tsang, Sunnyvale; Robert M. Valletta, Citrus Heights, all of Calif.

[73] Assignee: International Business Machines Corporation, Armonk, N.Y.

[21] Appl. No.: 208,398

[22] Filed: Mar. 9, 1994

[51] Int. Cl.6 .................................................. G11B 5/42
[52] U.S. Cl. ................................. 29/603; 204/192.34; 360/113; 430/314
[58] Field of Search .................. 29/603; 430/313, 314; 204/192.34, 192.32; 360/110, 113

[56] References Cited

U.S. PATENT DOCUMENTS 5,116,719  5/1992  Gau ........................................ 430/313
5,168,409  12/1992  Koyama et al. ...................... 360/113
5,200,056  4/1993  Cohen et al. ................. 204/192.34 X

FOREIGN PATENT DOCUMENTS 61-130848  6/1986  Japan .
3-162706  7/1991  Japan .

Primary Examiner—Carl E. Hall
Attorney, Agent, or Firm—Baker, Maxham, Jester & Meador

[57] ABSTRACT

A merged MR head is provided which has vertically aligned sidewalls so as to minimize side-fringing and improve off-track performance. The bottom pole piece P1, which comprises the second shield layer S2 of the read head, has a pedestal pole tip with a short length dimension. A pedestal pole tip with a length as short as two times the length of the gap layer G optimally minimizes the sidewriting and improves off-track performance. The bottom pole tip structure of the write head is constructed by ion beam milling using the top pole tip structure as a mask. The ion beam milling is directed at an angle to the sidewalls of the top pole tip structure which causes the bottom pole tip structure to be milled with sidewalls which align with the top pole tip structure. The ion beam milling can comprise two angled beams, either sequentially or simultaneously, the first beam performing primarily a cutting operation and some clean up work while the second beam primarily conducts clean up work of the redeposition of the debris caused by the cutting. In another embodiment, a single angled ion beam can be employed, provided its angle is within a particular range.

28 Claims, 12 Drawing Sheets

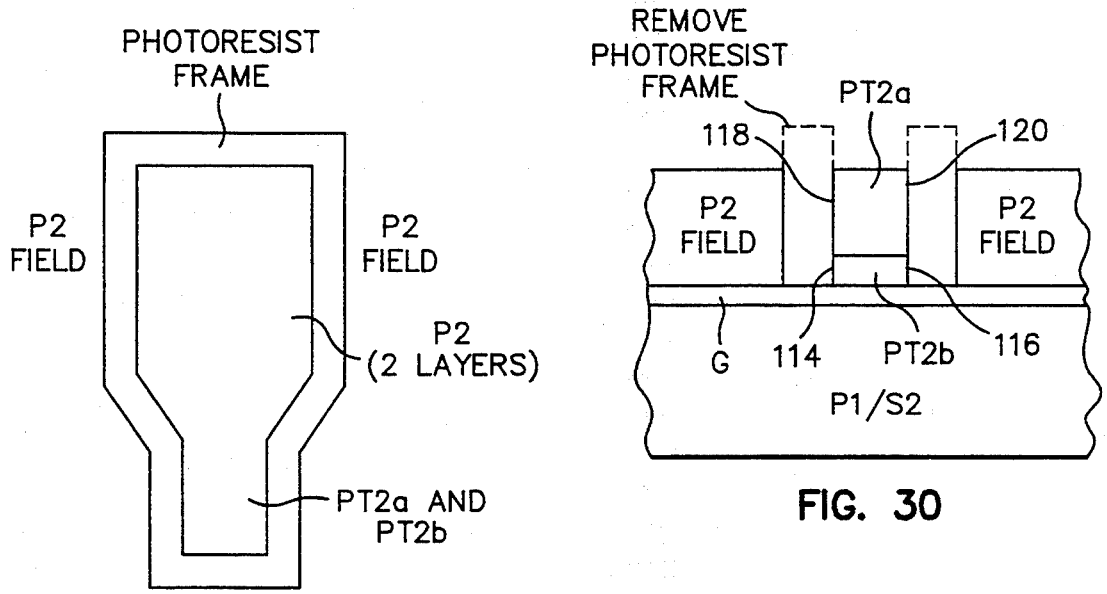
FIG. 29
FIG. 30
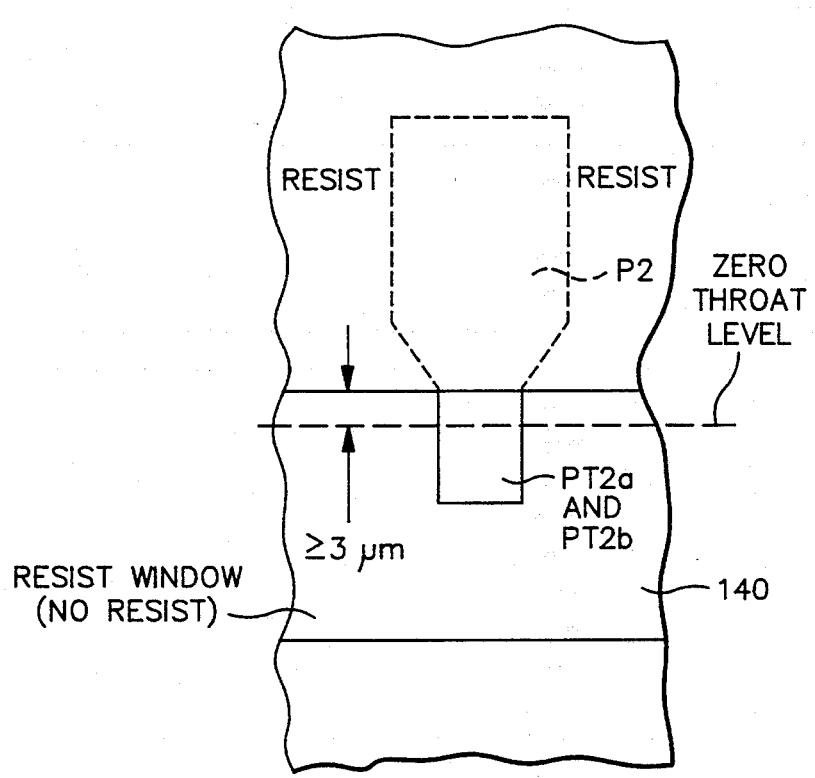
FIG. 31

METHOD OF MAKING A THIN FILM MERGED MR HEAD WITH ALIGNED POLE TIPS

BACKGROUND OF THE INVENTION

1. Field of the Invention

The present invention relates to a thin film merged magnetoresistive (MR) head which has aligned pole tips and to a method of manufacturing the head.

2. Description of the Related Art

In a magnetic disk drive, data is written and read by thin film magnetic transducers called "heads" which are supported over a surface of the disk while it is rotated at a high speed. The heads are supported by a thin cushion of air (an "air bearing") produced by the disk's high rotational speed.

Thin film magnetic write heads are desirable because they provide high areal density and thin film magnetic read heads are desirable because of their high resolution. Thin film magnetic heads are also easy to manufacture. With various thin film manufacturing techniques, the heads can be fabricated in batches on a ceramic substrate, and then diced into individual heads.

A thin film write head includes bottom and top pole pieces P1 and P2, respectively, that are formed from thin films ("layers") of magnetic material. The pole pieces have a pole tip height dimension commonly called "throat height". In a finished write head, throat height is measured between an air bearing surface ("ABS"), formed by polishing the tips of the pole pieces, and a zero throat height level ("zero throat level"), where the bottom pole piece P1 and the top pole piece P2 converge at the magnetic recording gap. A thin film magnetic write head also includes a pole tip region, which is located between the ABS and the zero throat level, and a back area, which extends back from the zero throat level to and including a back gap. Each pole piece has a pole tip portion in the pole tip region and a back portion in the back region. The pole pieces are connected together at the back gap.

The pole tips are extensions of the bottom and top pole pieces P1 and P2 of the write head. Each of the pole pieces P 1 and P2 transitions to a pole tip in the pole tip region. The pole tips are separated by a gap (G), which is a thin layer of insulation material. The pole tip of the top pole piece P2 is the last element to induce flux into a magnetic medium; therefore, its width is more important than the width of the pole tip on the bottom pole piece P1. However, as will be explained in detail hereinafter, it is important for the pole tips to have the same width so as to minimize flux leakage therebetween.

In order to increase the amount of data stored per unit of disk surface area ("areal density"), a write head must write more data in narrower tracks on the disk surface. Accordingly, areal density can be improved by decreasing the gap length between the pole tips. By decreasing the gap length, the bit density within a track is improved. The shortness of the gap length is limited by the decreasing flux intensity between the pole tips. Areal density can also be improved by increasing the number of data tracks which a write head can record on a disk; the related parametric expression is "tracks per inch" or "TPI". The TPI capability of a write head is increased by decreasing the head dimension which determines the width of a data track; typically this dimension is called the head "track width".

An MR read head employs a magnetoresistive (MR) element which changes resistance in response to magnetic flux density from a rotating magnetic disk. A sensing current, which is passed through the magnetoresistive element, varies proportionately to the change in resistance of the magnetoresistive element. The response of the magnetoresistive element is based on how well the resistance change of the magnetoresistive element follows the change in flux density sensed from the magnetic medium. In a disk drive, a differential preamplifier is connected to the magnetoresistive element for processing readback signals from the read head. The magnetoresistive element is a thin film layer which is sandwiched between bottom and top gap (insulation) layers G1 and G2 which, in turn, are sandwiched between bottom and top shield layers S1 and S2. The distance between the shield layers is called the read gap. The smaller the read gap, the greater the resolution of the MR read head.

A recent advance in technology has provided a merged MR head. A merged MR head employs an MR read head and a write head in combination. This is accomplished by using the top shield S2 of the MR head as the bottom pole P1 of the write head. A merged MR head has a high capability for either reading or writing. The merged MR head saves processing steps over constructing separate read and write heads because the second shield layer S2 of the MR read head also serves as the bottom pole P1 for the write head thereby eliminating a fabrication step. Another advantage of the merged MR head is that the elements of the read and write heads can be easily aligned on a single suspension system for reading immediately after writing.

However, present merged MR head structures generate significantly large side-fringing fields during recording. These fields are caused by flux leakage from the top pole P2 to the parts of the bottom pole P1 beyond the region defined by P2. The side-fringing fields limit the minimum track width achievable and therefore limit the upper reach of track density. Consequently, when a track written by the recording element of a merged MR head is read by the MR element, the "offtrack" performance of the MR element is poor. That is, when the MR element is moved laterally from the center of a track being read, it cannot move far before interference from the fields of the adjacent track begins to interfere with the fields of the track being read.

In an inductive head, the sidewalls of the bottom and top pole tips PT1 and PT2 are substantially vertically aligned and constrained to substantially equal widths by ion beam milling through the top and bottom pole pieces. However, because of shadowing caused by the top pole tip PT2 during this process, there is some outward taper to the bottom pole tip PT1. While the asymmetry of this taper results in some undesirable effects, the sidewalls of the pole tips are generally vertically aligned to prevent side-flinging beyond the edges of the gap between the pole tips.

The present methods for fabricating a merged MR head deposit a gap layer on top of the second shield layer S2 and then deposit the top pole tip PT2 on top of the gap layer. The pole tip PT2 can be defined either by photoresist frame plating or ion beam milling. The width of the pole tip PT2 is kept narrow, in the order of 5 $\mu$m, so as to limit the width of written tracks. However, the second shield layer S2 of the MR read head is very wide, in the order of 50 $\mu$m, in order to shield the MR element in the read head. The disparity between these widths results in a side-fringe flux field between the pole tip elements which extends laterally beyond the width of the top pole tip PT2. This is caused by the width of the second shield S2, which provides a large lateral channel for the flux lines from the top pole tip element PT2. It would be desirable for the second shield member S2, which comprises the bottom pole tip element PT1, to have sidewalls which are aligned with the sidewalls of the top pole tip element PT2. However, this is impossible since the second shield member S2 has to be wide in order to protect the MR element. This then would appear to prevent improvement in the off-track performance problem of the merged MR head.

One solution to the side-fringing problem of the merged MR head is to construct a narrow pole tip portion PT1$b$ on top of the second shield layer S2, the S2 layer then serving as a wider, bottom pole tip element PT1$a$. Both of these pole tips are the pole tip portion of the bottom pole P1, with the pole tip layer PT1$b$ forming a pedestal on the pole tip element PT1$a$. The gap layer is then formed on top of the pole tip layer PT1$b$ and the pole tip element PT2 of the top pole piece P2 is formed on top of the gap layer. This pole tip arrangement can be constructed either of two ways: (1) frame plating each of the pole tips PT1$b$ and PT2 using photoresist masking techniques or (2) masking the yoke area of the top pole P2 and ion beam milling through both of the pole tips PT2 and PT1$b$ as well as the gap layer therebetween. In the frame plating process, it is extremely difficult to align the sidewalls of the pole tips PT2 and PT1$b$. This is because each of the pole tips is plated in a separate process, resulting in misalignment of the photoresist masks. In ion beam milling, redeposition of milling debris builds up on PT2 during the process, causing a shadowing of the pole tip layer PT1$b$ therebelow. This shadowing, which is also encountered in constructing the inductive head discussed hereinabove, results in an outward taper configuration of the lower pole tip PT1$b$. Shadowing laterally extends the lower pole tip, and provides a magnetic path for side-fringing fields. Attempts have been made to remove the debris and to vertically align the sidewalls of these pole tips by directing the ion beam at an angle to the sidewalls rather than straight down. This will cut away some of the debris; however, the accumulated debris is too thick to allow obtaining vertical sidewalls by this process.

SUMMARY OF THE INVENTION

The side-flinging problem of the prior art merged MR head has been solved by the discovery of two unique steps in the process of manufacturing the merged MR head. The first discovery is that the length of the pole tip PT1$b$ (pedestal portion with respect to the S2/PT1$a$ pole tip) can be made shorter than previously thought. The inventors have observed that a pedestal pole tip PT1$b$ with a length of 0.5 to 2.5 times the length g of the gap G will significantly reduce side-fringing fields provided the sidewalls of the pole tip PT1$b$ are vertically aligned with the sidewalls of the pole tip element PT2. Vertical alignment has been accomplished by a second discovery involving two steps. The first step is to frame plate the pole tip PT2 on top of the gap layer with a desired width. The thickness of the layer may be thicker than the desired final thickness since this thickness will be reduced by the next process step. For instance, if a final thickness of 5 $\mu$m is desired, an additional 2 $\mu$m may be added, giving a total thickness of 7 $\mu$m. With a photoresist frame plating process, a pole tip PT2 with a 7 $\mu$m thickness can be constructed with vertical sidewalls. The next step is to direct an ion beam at the magnetic layer below the pole tip PT2 at an angle to the sidewalls of the pole tip PT2 using the pole tip PT2 as a mask to notch the magnetic layer therebelow on each side of the sidewalls to form the pedestal pole tip PT1$b$. With a proper angle or angles, the surprising result is that the sidewalls of the pedestal pole tip PT1$b$ will be vertically aligned with the sidewalls of the pole tip PT2. Since the length of the pedestal pole tip PT1$b$ can be quite small, to adequately reduce flux leakage the pedestal pole tip element PT1$b$ can be milled directly into the second shield layer S2. This eliminates depositing a layer on top of the second shield layer S2 in order to form a pedestal thereon. A typical gap length is 0.3 $\mu$m, which results in a length of the pedestal pole tip element PT1$b$ of approximately 0.6 $\mu$m. The notching of the second shield layer S2 by the ion beam milling to obtain the pedestal pole tip element PT1$b$ will not affect its capability to shield the magnetoresistive element. By directing the ion beam at an angle to the sidewalls of the pole tip PT2, the ion beam cuts and concurrently cleans up redeposition. It has been found that an angle of 55° produces satisfactory results. However, an even better milling process employs two ion beams either sequentially or simultaneously. It has been found that a first beam directed at 30° performs a cutting and partial clean up of the redeposition, and a second beam of 75° cleans up any remaining redeposition to provide vertically aligned sidewalls between the pole tips PT2 and PT1$b$. Alternatively, a magnetic layer can be laid on top of the second shield layer S2 and notched by the steps described for the second discovery. However, this requires an additional process step which is not necessary unless a different material is desired. Alternatively, the gap layer can either be milled by the ion beam or defined by chemical etching before defining the pedestal pole tip PT1$b$ therebelow. Significantly, track widths less than 2 $\mu$m can be achieved with the two discoveries. In contrast, the track width of the inductive head has not been less than 3 $\mu$m.

An object of the present invention is to provide a thin film magnetic head which has vertically aligned pole tips so as to minimize sidewriting.

Another object is to provide a thin film merged MR head which has improved off-track performance.

A further object is to provide a merged MR head with a second shield layer S2 that serves both as a shield for the magnetoresistive element therein and as a pole tip for the write head thereof with good off-track performance.

Yet another object is to provide a merged MR head in which the second shield layer S2 has a pedestal of a small height, the pedestal serving as a pole tip element PT1$b$ and the S2 layer therebelow serving as a pole tip element PT1$a$ for the lower pole P1 of a write head, and in which the sidewalls of the pole tip element PT1$b$ are vertically aligned with sidewalls of a pole tip PT2.

Other objects and advantages will become apparent when considered in light of the following description of the invention.

BRIEF DESCRIPTION OF THE DRAWINGS

FIGS. 29 through 33 are similar to FIGS. 24 through 28, respectively.

DESCRIPTION OF THE PREFERRED EMBODIMENTS

Figure 1:
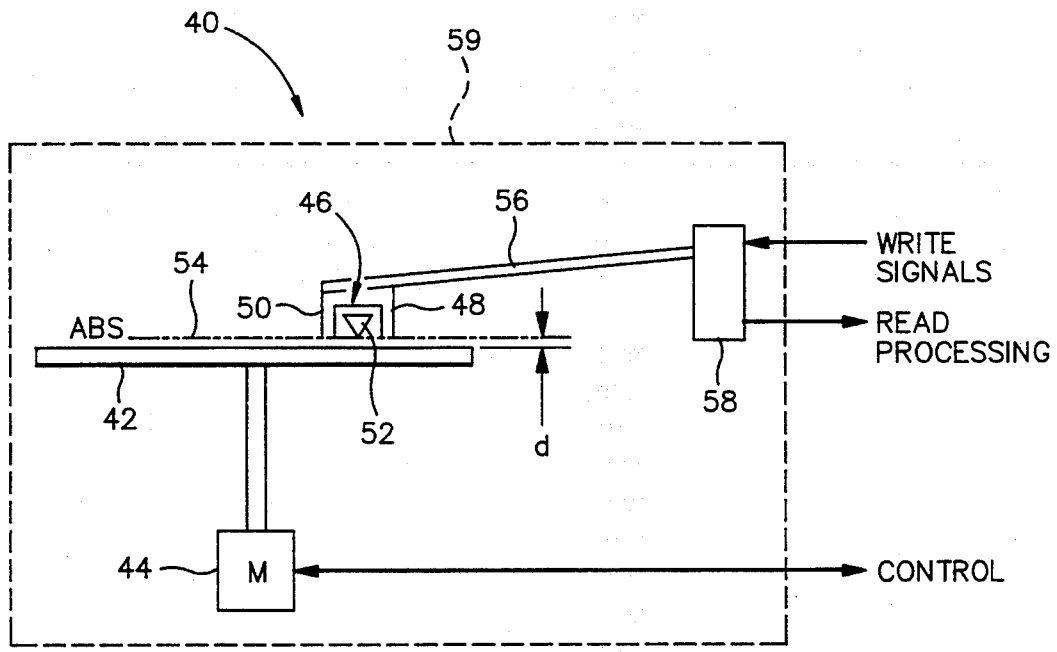
FIG. 1 is a schematic illustration of a disk drive, not to scale, which employs a thin film merged MR head of the present invention.

Referring now to the drawings wherein like reference numerals designate like or similar parts throughout the similar views, there is illustrated in FIG. 1 a magnetic disk drive 40 which includes a rotating magnetic disk 42. The disk 42 is rotated by a motor 44 which is responsive to control signals from a drive control source (not shown). When the disk 42 is rotated, a thin film merged MR head 46, mounted on a slider 48, is supported above a surface of the magnetic disk 42 by a thin layer of air called an "air bearing". The merged head 46 includes an MR read head 50 and a write head 52. The bottom surfaces of the slider 48 and the merged head 46 are in the plane of an air bearing surface (ABS) 54 of the slider. The ABS 54 is spaced from the surface of the magnetic disk 42 by a distance d which is the flying height of the merged MR head 46 when the magnetic disk is rotating. The slider 48 is connected to a head suspension assembly 56 which includes means for conducting read/write signals between drive electronics 58 and the head. The above components of the drive are mounted within a drive housing 59.

Figure 2:
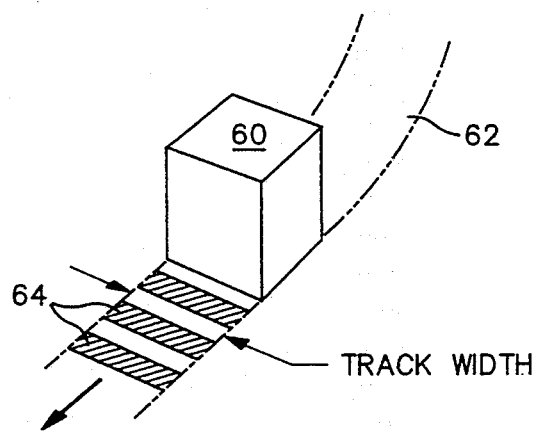
FIG. 2 is a schematic illustration of the critical portion of the pole tip of a thin film write head positioned above a track on a magnetic disk.

Pole tip elements of the write head 52 are schematically illustrated at 60 in FIG. 2 in an operating relationship with a track 62 of a rotating magnetic disk. Flux reversals representing information recorded on the track by the write head are schematically illustrated at 64. The number of these flux reversals per inch length of the track is a measure of the linear or bit density of the read head. When the length of the write head gap is reduced, the bit density is increased. Another important measure is the TPI of the write head 60. The narrower the width of the write head's pole tip elements, the greater the TPI. The product of the bit density and TPI provides the areal density of the write head. This is a measure of how much information can be written per unit area of the magnetic disk.

Figure 3:
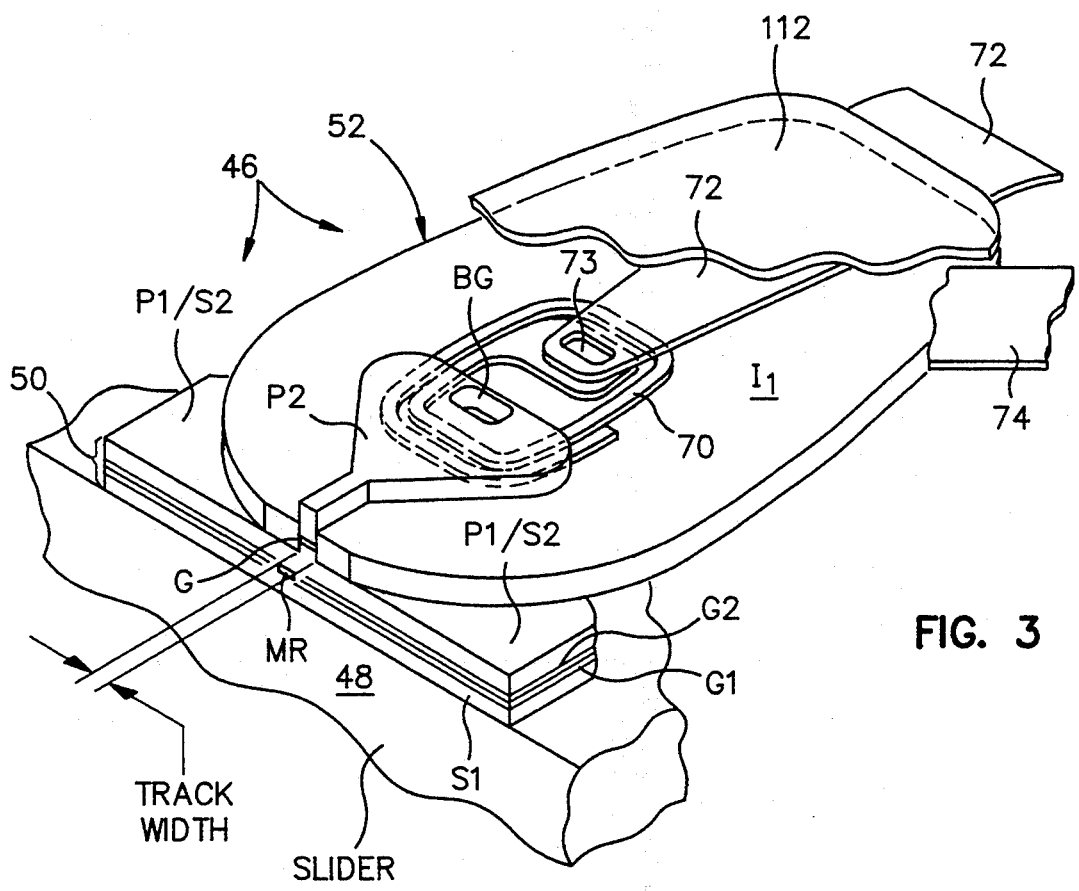
FIG. 3 is an isometric illustration of a thin film merged MR head with the layers of the write head being mounted on top of the layers of an MR read head.

FIG. 3 illustrates a portion of a merged MR head 46 showing the MR read head 50 and the write head 52. The merged MR head 46 is mounted on the slider 48.

As shown in FIG. 3, the read head 50 includes a magnetoresistive element MR which is sandwiched between first and second gap layers G1 and G2, the gap layers in turn being sandwiched between first and second shield layers S1 and S2. In a merged MR head the second shield layer S2 of the read head 50 also serves as the bottom pole piece P1 for the write head 52 as will be explained in more detail hereinafter.

Figure 5:
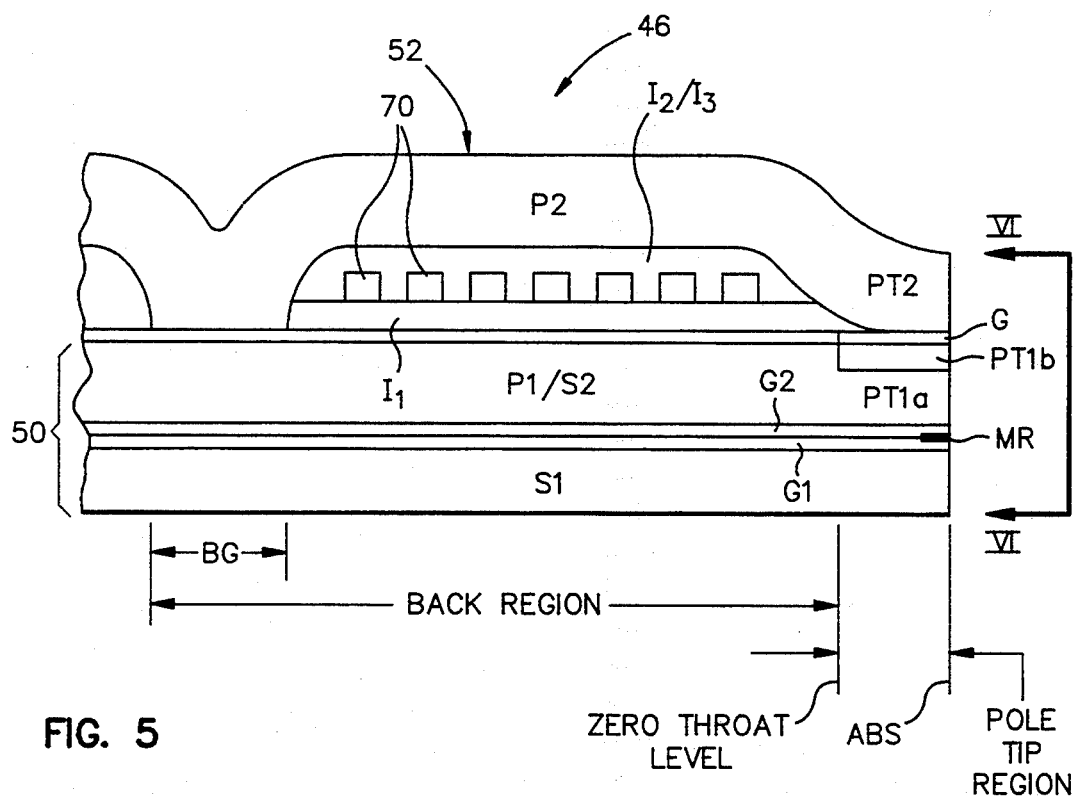
FIG 5 is a side view of embodiment of the present thin film merged MR head.

As shown in FIG. 5, the write head 52 has a pole tip region which is located between the air bearing surface (ABS) and a zero throat level and a yoke or back region which extends back from the zero throat level to and including a back gap. The write head 52 includes a bottom pole piece P1 and a top pole piece P2. The bottom pole piece P1 comprises the second shield layer S2 of the read head 50. Each pole piece P1 and P2 also has a back layer portion which is located in the back region, the back layer portions of the pole pieces being magnetically connected at the back gap (BG). The bottom pole piece P1 includes a pole tip structure which is located in the pole tip region between the ABS and the zero throat level. This pole tip structure includes a bottom pole tip element PT1$a$ and a top pole tip element PT1$b$. The top pole piece P2 includes a pole tip structure which is located in the pole tip region between the ABS and the zero throat level. This pole tip structure includes a top pole tip element PT2. The pole tip elements PT1a and PT1b are integrally formed from second shield S2 of the read head 50 which will be explained in more detail hereinafter. A pole gap layer (G) is sandwiched between the pole tip elements PT1b and PT2. A desired thickness (gap length) of this layer is about 0.3 $\mu$m which will optimize the linear density of the write head without sacrificing its flux intensity. However, acceptable gap lengths range from 0.1 $\mu$m to 0.7 $\mu$m. The gap layer G may extend to the back gap BG or alternatively may terminate at the zero throat level.

A first insulation layer $I_1$ is deposited on top of the gap layer G by any suitable method such as photolithography. On top of the first insulation layer $I_1$ there is deposited a coiled conductor layer 70 by any suitable method such as photoresist frame plating. On top of the coiled conductor layer 70 there are deposited second and third insulation layers $I_2$ and $I_3$ by any suitable means, such as photolithography.

Figure 6:
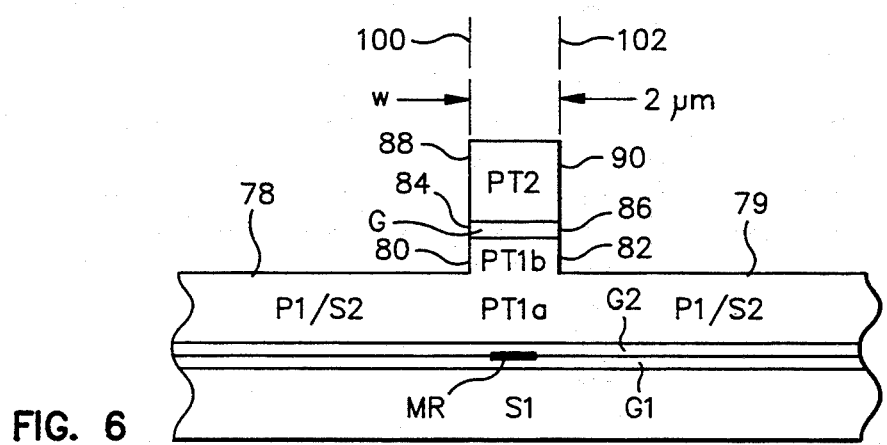
FIG. 6 is an ABS view taken along plane VI—VI of FIG. 5.

The merged MR head 52 is referred to as "merged" because the bottom pole piece P1 and its pole tip comprise the second shield layer S2 of the MR read head, as shown in FIGS. 5 and 6. One feature of a merged head is that a process step in depositing an extra magnetic layer is eliminated. However, the large width of the second shield layer S2 beyond the sides of the gap G, as illustrated in FIG. 6, causes flux to extend toward the second shield layer S2 beyond the width of the pole tip element PT2. This "side-fringing" flux causes sidewriting, which can degrade off-track performance. This problem has been overcome by notching the second shield layer S2 at 78 and 79 on each side of the gap G so as to provide the second shield layer S2 with a pedestal which forms a pole tip element PT1b. Below the pedestal pole tip element PT1b is an area which can be referred to as a pole tip element PT1a. The pole tip elements PT1a and PT1b are forward extensions of the bottom pole piece P1 which comprises the second shield layer S2. The width of the second shield layer S2 is sufficient to effectively shield the MR element of the read head 50. This width can be in the order of 50 $\mu$m, in comparison to a width of 2 $\mu$m for the width of the pole tip elements. It should be noted that the notching 78 and 79 of the second shield layer S2 provides the pedestal pole tip element PT1b with first and second vertical sidewalls 80 and 82. Similarly, the gap layer G has first and second vertical sidewalls 84 and 86. The pole tip element PT2 on top of the gap layer G has first and second vertical sidewalls 88 and 90. The first sidewalls 80, 84, and 88 of the pole tip elements PT1b, the gap G, and the pole tip elements PT2, respectively, lie contiguously in a first vertical plane 100 and the second vertical walls 82, 86, and 90 lie contiguously in a second vertical plane 102. As shown in FIG. 6, the vertical planes 100 and 102 are equally spaced from one another at the ABS to form the track width w of the write head 52. The first and second vertical planes 100 and 102 are also perpendicular to the ABS. The first and second vertical planes 100 and 102 are preferably equally spaced all the way from the ABS to the zero throat level. However, they could diverge from the ABS if desired. The vertical alignments of the sidewalls of the pole tip elements in the first and second vertical planes 100 and 102 are important in combination with the pedestal pole tip PT1b to minimize sidewriting caused by the large lateral width of the second shield layer S2.

The importance of this pedestal pole tip PT1b is described in the next paragraph.

Figure 9:
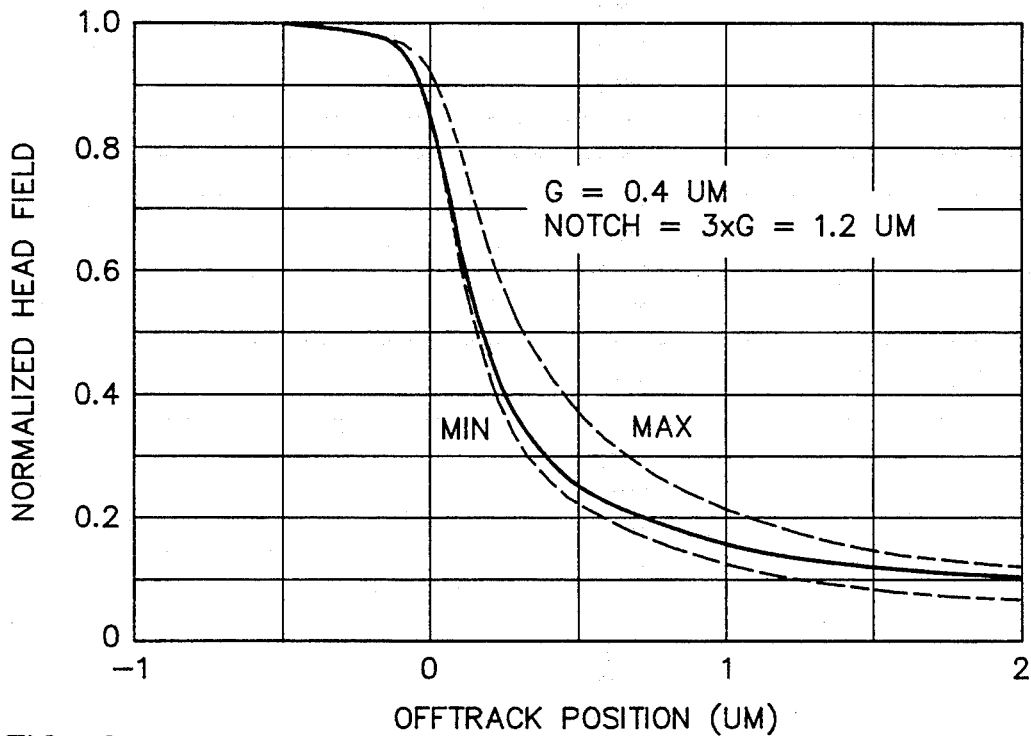
FIG. 9 through 12 are graphs illustrating sidewriting by a merged MR head made according to the invention.
Figure 10:
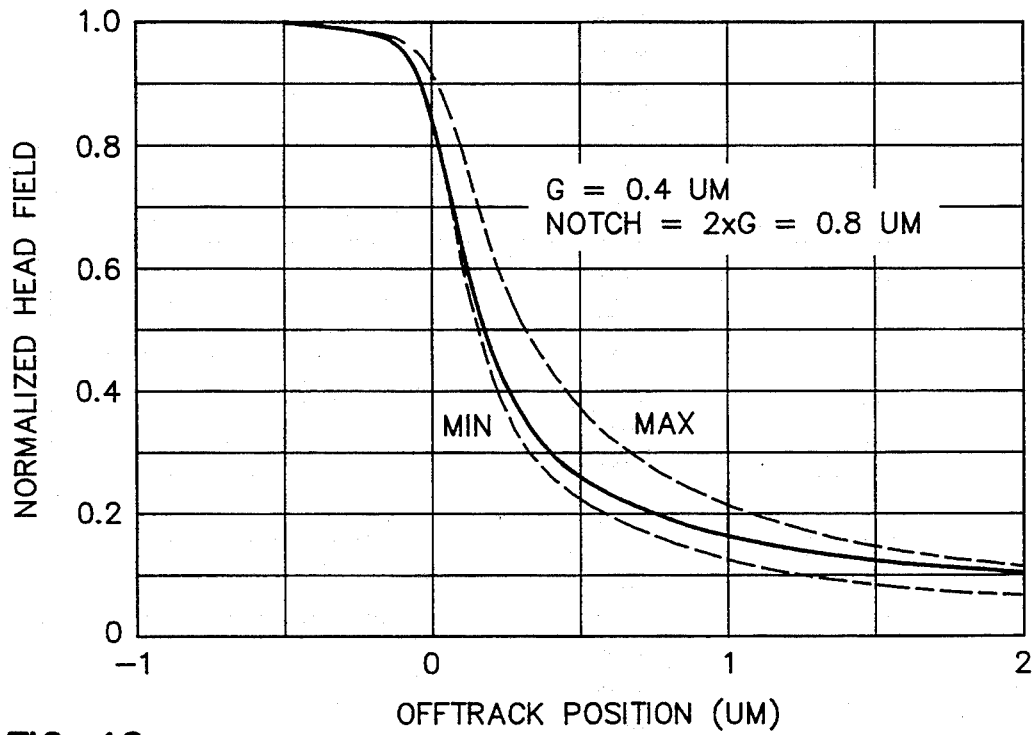
Figure 11:
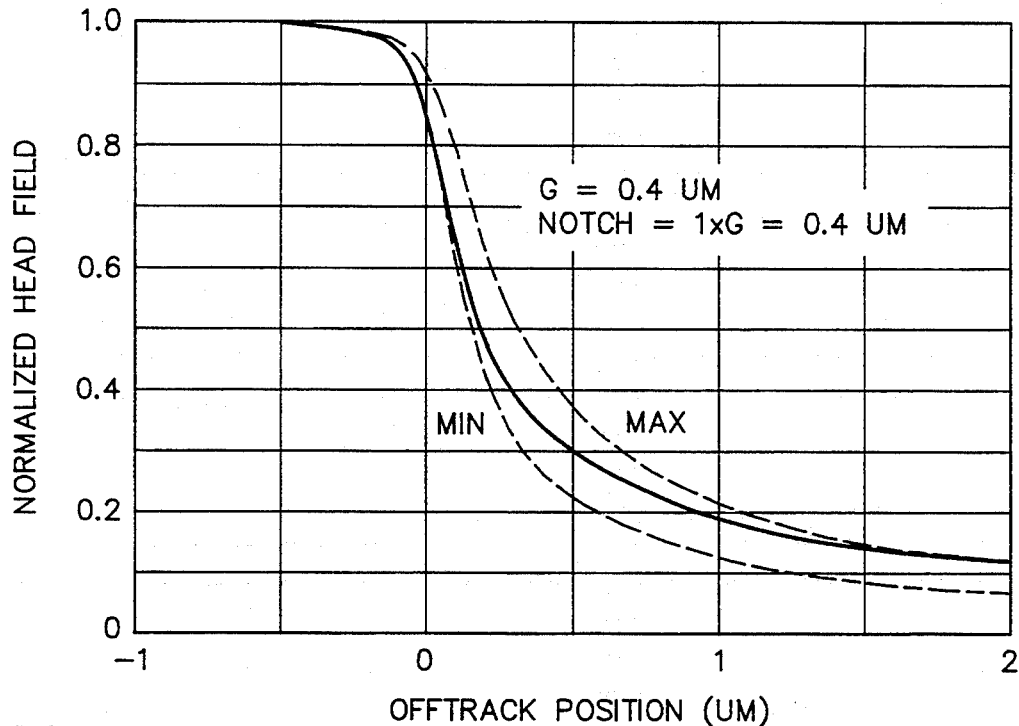
Figure 12:
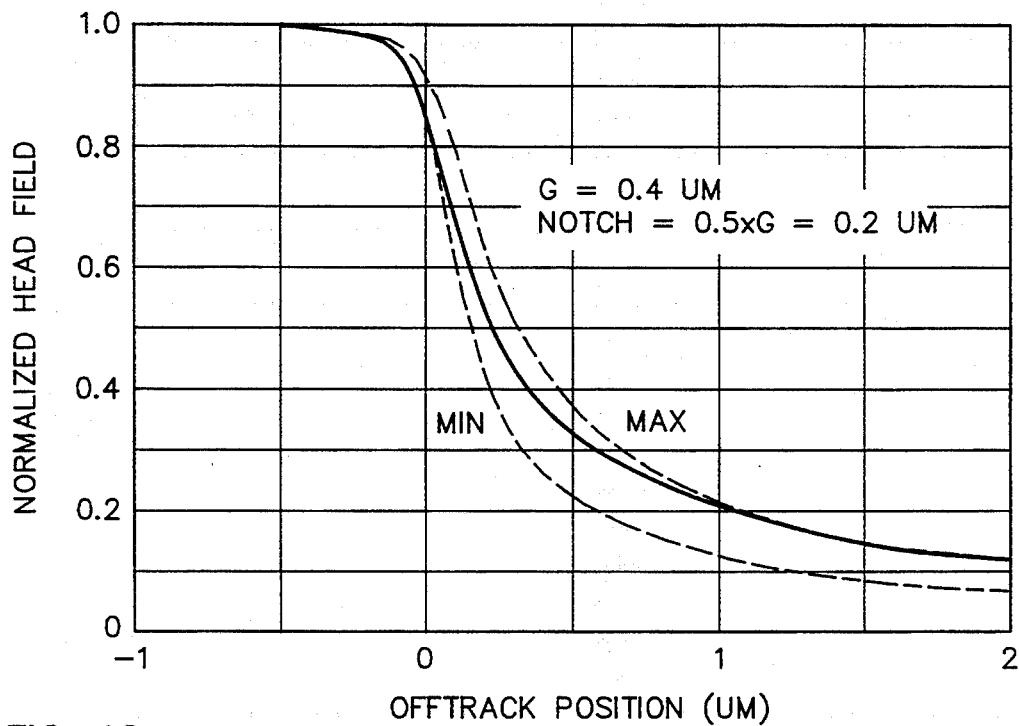

It has been discovered that the length of the pedestal pole tip element PT1b can be much less than previously thought possible. The inventors have determined the optimum notching depth of the second shield layer S2 to form a pedestal pole tip element PT1b with an optimum length. FIGS. 9 through 12 show the results of that analysis. The following apply to each of the FIGS. 9 through 12: (1) in plane sidetrack write field of a bottom pole piece (P1) notched write head is shown; (2) normalized head field is plotted versus off-track position in $\mu$m; (3) the effective fringe field was taken at 0.4 of the normalized head amplitude since most heads are designed around a maximum write field of 2.5 times the disk media coercivity; (4) the offtrack position is measured from a sidewall of the gap G along the gap's lateral centerline; (5) the gap length is 0.4 $\mu$m; (6) the flying height of the head above the rotating disk is 0.075 $\mu$m; (7) the dotted line entitled "maximum" is the sidetrack write field with no notching and therefore no pedestal pole tip element PT1b so that the gap layer G lies directly on the second shield layer S2 (see FIG. 14); (8) the dotted line entitled "minimum" is the sidetrack write field for a pedestal pole tip element PT1b of infinite length; and (9) the continuous line between the dashed "maximum" and "minimum" lines is the result of the analysis. In FIG. 9 the length of the pedestal pole tip element PT1b, shown in FIG. 5, is three times the length of the gap, or 1.2 $\mu$m. It can be seen at 0.4 of the normalized head field that the sidetrack write field is very close to the minimum sidetrack write field of a pedestal pole tip element PT1b of infinite length. In FIG. 10, the length of the pedestal pole tip PT1b is two times the length of the gap, or 0.8 $\mu$m. The result at 0.4 normalized head field is still very close to the minimum sidetrack write field of the pole tip element of infinite length. In FIG. 11, the length of the pedestal pole tip PT1b is one times the length of the gap, or 0.4 $\mu$m, which has a performance which is still closer to the infinite pole tip represented by the "minimum" dashed line than it is to the absence of the pole tip represented by the "maximum" dashed line. FIG. 11 illustrates that even with a 0.4 $\mu$m notching of the second shield layer S2, a pedestal pole tip PT1b of a length 0.4 $\mu$m makes a considerable improvement in off-track performance of the write head over a write head which has no pedestal at all. In FIG. 12, the length of the pedestal pole tip PT1b is 0.5 times the length of the gap, or 0.2 $\mu$m. Even with a 0.2 $\mu$m length, the pedestal pole tip PT1b provides a 40% improvement over having no pedestal at all at the 0.4 normalized head field.

The aforementioned analysis demonstrates that the length of the pedestal pole tip PT1b can be very short and still accomplish significant improvement in off-track performance. An acceptable range for this length is 0.5 to 3.0 the gap length with two times the gap length being the preferred or optimum length of the pedestal pole tip PT1b. It should be understood that the length of the gap may be different than the 0.4 $\mu$m demonstrated. The length of the gap can range all the way from 0.1 $\mu$m to 0.7 $\mu$m for acceptable performance. The notching or length of the pedestal pole tip PT1b would accordingly be 0.5 to 3.0 times the designed gap length. Of considerable significance is that the pedestal element PT1b can be formed in the second shield layer S2 of the read head 50 without altering the performance of the layer S2 in shielding the MR element. The second shield layer S2 is typically 7 to 8 μm thick and a notching of approximately 1 μm will not affect its performance. However, if desired, the second shield layer S2 can be deposited with a greater thickness so as to allow for the notching 78 and 79. The important thing is that the notching saves a step in depositing a separate layer for the pedestal pole tip PT1b. However, it should be understood that a separate layer could be deposited on top of the second shield layer S2 and then appropriately notched to provide a pedestal pole tip element PT1b which is of a different material than the second shield layer S2. This may be desired where the pedestal pole tip PT1b is of a different material than the second shield layer S2. For instance, the pedestal pole tip PT1b can be constructed of a high moment of saturation material, such as ferric nitride, to handle a large amount of flux whereas the second shield layer S2 may be constructed of a lower moment of saturation material, such as Pennalloy. The construction of the pedestal pole tip PT1b of a different material than the second shield layer S2 is discussed in more detail hereinafter.

While the short length of the pedestal pole tip PT1b is an important discovery, it is also important that the sidewalls of the pole tip elements PT1b and PT2b be vertically aligned with respect to one another at the ABS, as shown in FIG. 6. The method of construction to achieve these vertical sidewalls is another discovery which is described in detail hereinafter under "Method of Making the Merged MR Head."

Figure 14:
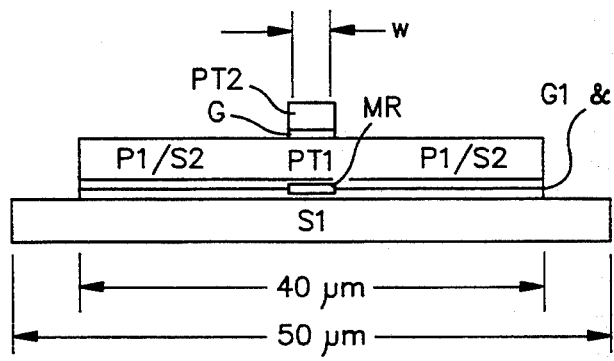
FIG. 14 is an ABS view of a prior an thin film merged MR head.
Figure 15:
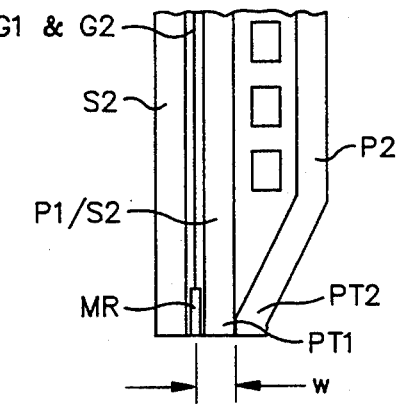
FIG. 15 is side view of the prior art thin film merged MR head shown in FIG. 14.

A comparison of the performance of the merged MR head 46 of FIGS. 5 and 6 can now be compared with the prior art merged MR head of FIGS. 14 and 15. In the prior art merged MR head, the pole tip element PT2 is formed on top of the second shield layer S2 with a gap G therebetween. The second shield layer S2 serves as the bottom pole piece P1 and, at its forward extension, the pole tip element PT1. The only element separating the pole tip element PT2 from the second shield layer S2 is the gap layer G. Because of the large lateral width of the S2 layer in comparison to the width of the pole tip element PT2, a substantial side-fringing field extends from the pole tip element PT2 beyond its width to the second shield layer S2. This results in substantial sidewriting and poor off-track performance. Desirably, the flux would transit between the pole tip element PT2 and the second shield layer S2, acting as a pole tip element PT1, totally within the plane formed by the sidewalls of the pole tip element PT2. It is this desired performance that the merged MR head of FIGS. 5 and 6 achieves.

Figure 13:
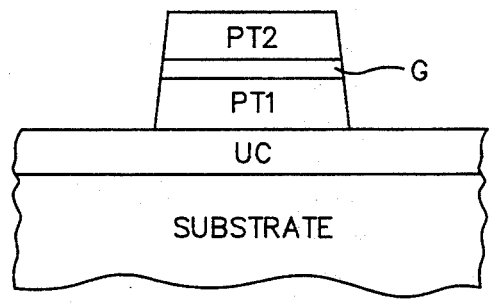
FIG. 13 is an ABS view of a prior art inductive head.

FIG. 13 illustrates an ABS view of a prior art inductive head. The inductive head includes pole tip elements PT1 and PT2 which are separated by a gap G. The inductive head employs the elements PT1, G and PT2 to perform both the read and write functions. During the write function a coil, not shown, induces flux into the pole tip elements PT1 and PT2 to perform the write operation. During the read operation the pole tip elements PT1 and PT2 and their corresponding pole pieces induce flux into the same coil for performing the read function. The off-track performance of this prior art inductive head is better than the off-track performance of the prior art merged MR head illustrated in FIGS. 14 and 15. This is because the sidewalls of the pole tip elements PT1 and PT2 are more nearly vertically aligned. However, the prior art construction of the inductive head necessarily results in the pole tips PT2 and PT1 widening toward the substrate. Both of the pole tips PT2 and PT1, in that order, are milled by a downwardly directed ion beam during their construction. When the ion beam is directed straight down, a substantial amount of redeposition of milled debris accumulates on the sidewalls of the milled pole tip elements causing the top pole tip element PT2 to shadow the bottom pole tip element PT1 thereby giving it its outwardly tapered shape, as shown in FIG. 13. The wider pole tip element PT1 in contrast to the pole tip element PT2 will cause some undesirable sidewriting. Further, the ion milling of both pole tips (8 μm 10 μm) takes a long time.

Figure 7:
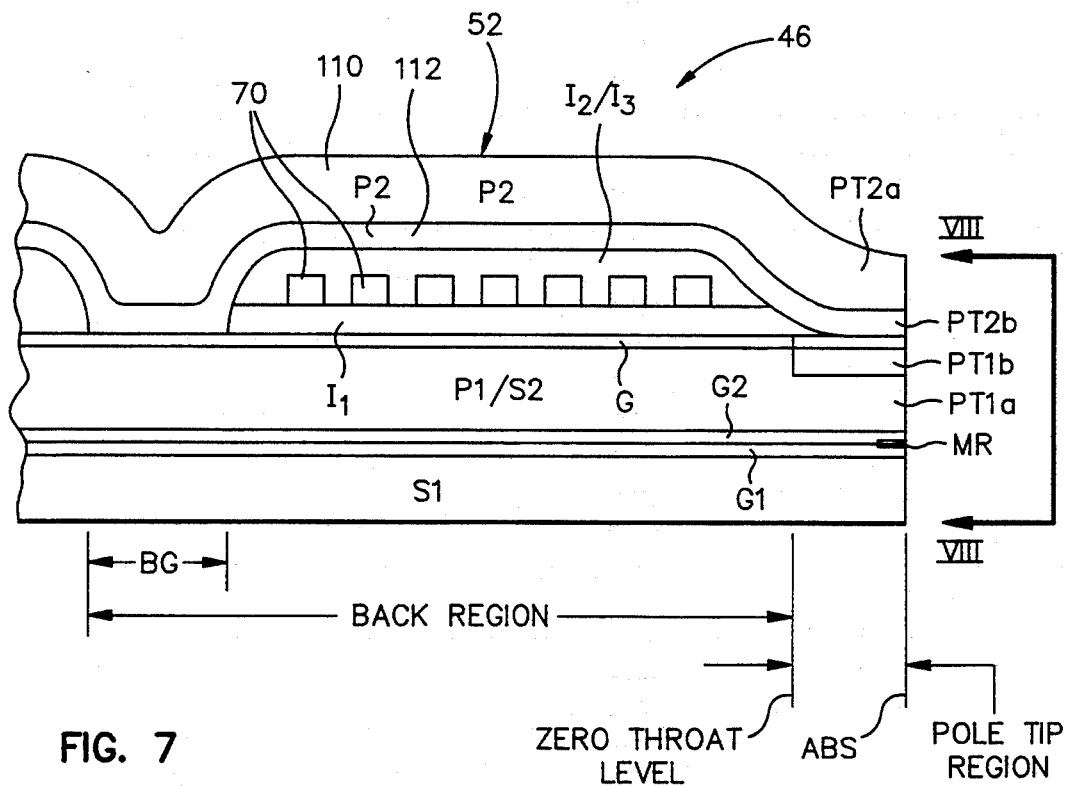
FIG. 7 is a side illustration of another embodiment of the present thin film merged MR head.
Figure 8:
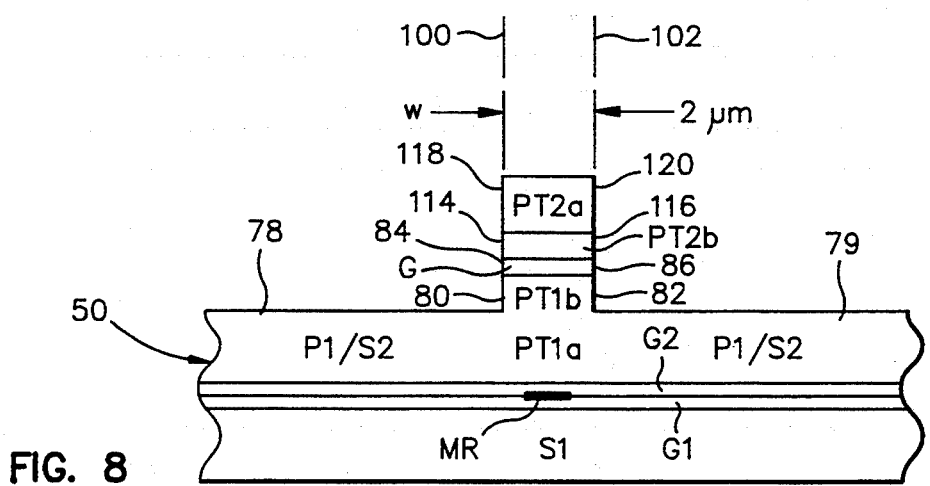
FIG. 8 is a ABS view of the shown in FIG. 7 taken along plane VIII—VIII.

FIGS. 7 and 8 illustrate another embodiment of the present invention which is slightly modified from the embodiment illustrated in FIGS. 5 and 6. In the embodiment of FIGS. 7 and 8 the top pole piece P2 is constructed of top and bottom magnetic layers 110 and 112 which have forward extensions forming pole tip elements PT2a and PT2b, respectively. The pole tip element PT2b has first and second vertical sidewalls 114 and 116 and the pole tip element PT2a has first and second vertical sidewalls 118 and 120. As shown in FIG. 8, the first sidewalls 80, 84, 114, and 118 of the pedestal pole tip PT1b, the gap layer G, and the pole tip elements PT2b and PT2a, respectively, lie in the first vertical plane 100, and the second vertical sidewalls 82, 86, 116, and 120 of the pedestal pole tip PT1b, the gap layer G, and the pole tip elements PT2b and PT2a, respectively, lie in the second vertical plane 102. While the pole tip element PT2a is shown having its sidewalls also vertically aligned with the pole tip elements therebelow, this is not necessary if the pole tip element PT2b has a length of approximately three times the length of the gap G. This is because the flux transfer at a distance beyond that length becomes somewhat insignificant. Accordingly, the pole tip element PT2a can be provided with a lateral width at the ABS which is considerably wider than the widths of the pole tip elements PT1b and PT2b. The pole tip elements PT2a and PT2b can be constructed in two separate layers when it is desired that the pole tip element PT2b be of a different material than the pole tip element PT2a. For instance, the pole element PT2b may be constructed of a high moment of saturation material, such as ferric nitride, whereas the pole tip element PT2a may be constructed of a lower moment of saturation material, such as Permalloy. With this arrangement, the pole tip element PT2b can carry a large amount of flux without saturation.

With the method of construction to be described hereinafter, the width of the pole tip elements for the present merged MR head 46 may be as narrow as 2 μm. This is less than the normal 4 to 5 μm for the width of the prior art inductive head illustrated in FIG. 5. The width of the pole tip elements PT1b and PT2 in FIGS. 5 and 6 or the width of the pole tip elements PT1b and PT2b in FIGS. 7 and 8 establishes the track width of the write head portion of the merged MR head. From this the TPI can be determined, which is a factor in producing the areal density of the write head.

Figure 4:
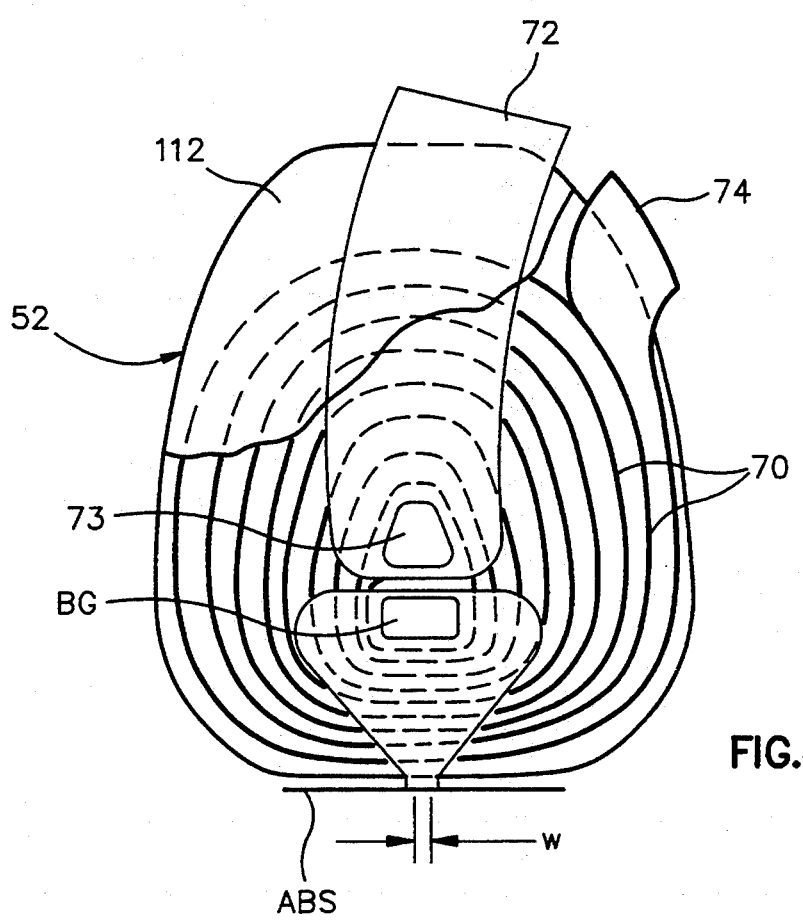
FIG. 4 is a top planar schematic illustration of the write head of FIG. 3.

FIGS. 3 and 4 illustrate a more complete embodiment of the write head with portions cut away to illustrate various details thereof. Part of a cover layer 112 has been broken away, the insulation layers I2 and I3 have been removed, and not all of the coiled conductor layer 70 is shown in FIG. 3. The conductor 70 extends around the back gap BG between the top and bottom pole pieces P2 and P1. One end of the coil conductor 70 is connected to a lead 72 at 73 and the other end of the conductor (not shown) is connected to a lead 74. When a signal current is transmitted to the conductor 70 via the leads 72 and 74, the conductor 70 induces flux in the top and bottom pole pieces P2 and P1. This, in turn, induces flux back and forth across the pole tips at the ABS.

Method of Making the Merged MR Head

Figure 16:
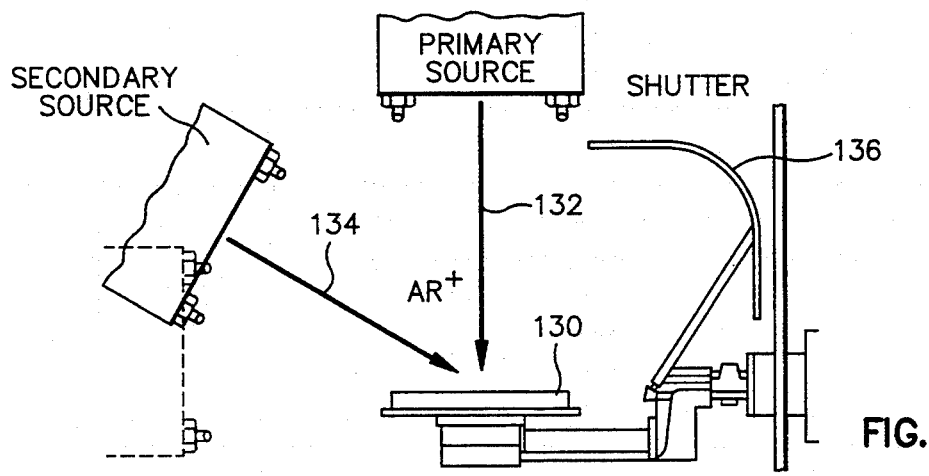
FIG. 16 is a schematic illustration of an exemplary ion beam chamber.

The merged MR head of the present invention is constructed using a unique combination of known thin film photolithography and ion beam milling steps. Photolithography includes depositing magnetic layers using a photoresist frame plating process and depositing insulation layers by a photoresist and developing process. Ion beam milling is performed in a chamber. Exemplary inner pans of such a chamber are illustrated in FIG. 16. The work piece (not shown) is placed on a turntable 130 and is rotated at a constant rpm. During rotation, one or more ion beams 132 and 134 are directed at the work piece. Preferably, these ion beams are argon ions. The primary source ion beam 132 is shown directed vertically downward and the secondary source ion beam 134 is shown directed at an angle to a vertical. As will be explained in more detail hereinafter, the ion beam milling of the present invention is accomplished by beams which are directed only at some angle from a vertical. A shutter 136 is pivotally mounted for switching the ion beams on and off with respect to the work piece (not shown) on the turntable 130.

The construction of the MR read head 50 portion of the merged MR head 46 is well known in the art. The layers S1, G1, the MR element, G2, and S2 are deposited by thin film photolithography process steps. As shown in FIG. 5, the second shield layer S2 of the read head is deposited from the ABS to and including the back gap so that the S2 layer has a pole tip portion between the ABS and the zero throat level and a back portion between the zero throat level and the back gap. The bottom pole piece P1 of the write head 52 comprises this second shield layer S2. This combination defines a merged MR head.

The second discovery of the present invention is twofold. First, the pole tip structure of the top pole piece P2 is utilized as a mask for ion beam milling a pedestal into the pole tip structure of the bottom pole piece P1. Secondly, the ion beam is directed at an angle to the sidewalls of the top pole tip structure either in a single angled beam or a pair of angled beams. The pair of angled beams is preferred and can be either directed sequentially or simultaneously. Instrumental in all embodiments is depositing the top pole tip structure with an additional thickness. This additional thickness will be reduced by the ion beam milling to form a pedestal in the bottom pole tip structure.

Various embodiments of directing the ion beam for constructing the FIGS. 5 and 6 embodiment of the present invention are illustrated in FIGS. 17 through 23. In this embodiment the pole tip element PT2 is employed as a mask for constructing the bottom pole tip structure. The same methods would be employed for constructing the FIGS. 7 and 8 embodiment of the present invention. In this embodiment the pole tip element PT2b alone or the pole tip element PT2b and PT2a can be employed as a mask for forming the bottom pole tip structure.

Figure 17:
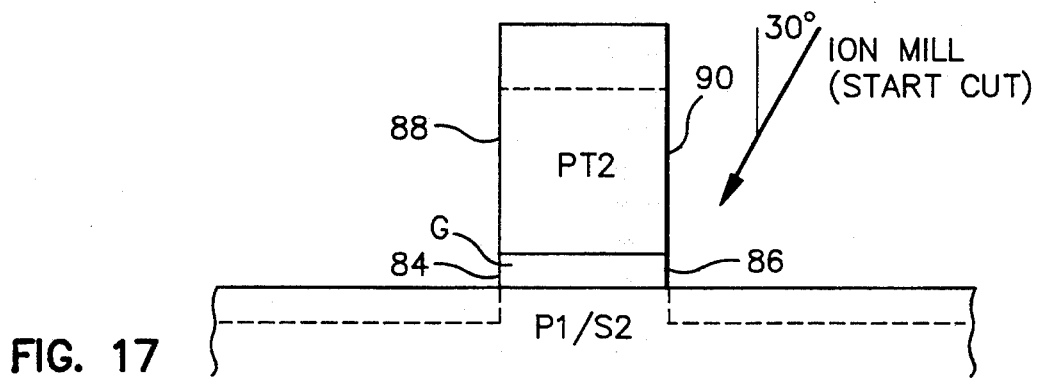
FIG. 17 is a ABS view of the commencement of ion milling at an angle to the sidewalls of the pole tip PT2.
Figure 18:
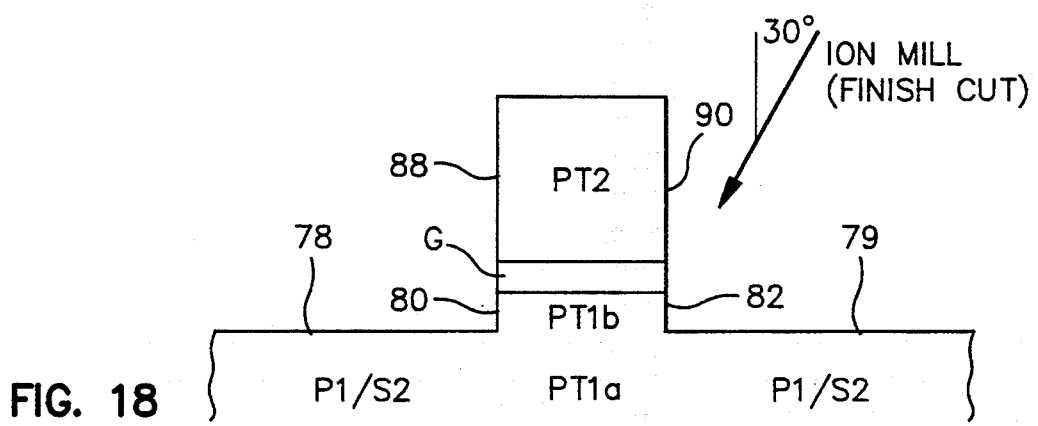
FIG. 18 the same as FIG. 17 except it is at the end of the ion milling step, which has notched the P1/S2 layer to form a pedestal pole tip PT1$b$.
Figure 19:
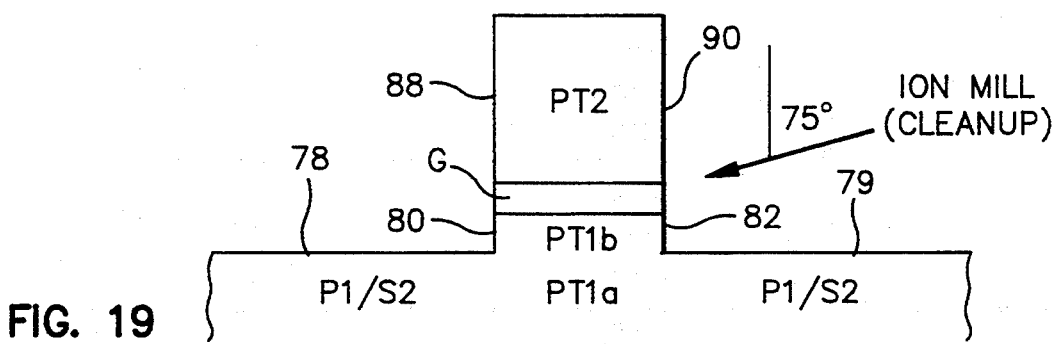
FIG. 19 is the same as FIG. 18 except the ion milling is at an increased angle to the sidewalls of the pole tip PT2 to clean up any redeposition of debris during the cutting operation in FIGS. 17 and 18.

FIGS. 17, 18, and 19 illustrate the use of two differently angled ion beams employed sequentially to form the bottom pole tip structure. FIG. 17 shows the pole tip element PT2 constructed with an extra thickness in order to allow for the reduction of thickness during the ion beam milling. The beginning thickness of the PT2 layer may be in the order of 7 $\mu$ with the extra thickness included in the order of 2 $\mu$m. The pole tip element PT2 is formed with vertical sides 88 and 90, the process for forming the pole tip element PT2 to be described in detail hereinafter. In FIG. 17, an ion beam is shown directed at an angle of 30° to the sidewall of the pole tip element PT2. While the ion beam is shown directed at only the sidewall 90 of the pole tip element PT2, it will be directed at both sidewalls 88 and 90 of the pole tip element PT2 due to rotation of the work piece by the turntable 130, as described hereinabove. The gap layer G is deposited on top of the P1/S2 layer and the pole tip element PT2 is deposited on top of the gap layer G. As stated hereinabove, when an ion beam is directly vertically downward, a considerable amount of the material cut (debris) is redeposited (redep) on the sidewalls of the milled elements. By angling the beam at 30° to the sidewalls of the pole tip element PT2, as illustrated in FIG. 17, significant cutting takes place, however, the beam also performs a degree of clean up of the debris during the cutting operation. The 30° angle is a preferred angle, however, it can range between 20° to 40° for the two-angle embodiment. FIG. 17 shows the commencement of the cutting operation and FIG. 18 shows the final result of the cutting operation. During this cutting operation, the pole tip element PT2 acts as a mask for cutting the pedestal pole tip element PT1b in the second shield layer S2. The 30° ion beam is followed by a 75° ion beam, as illustrated in FIG. 19, to clean up the redep which is still left from the 30° operation. The 75° ion beam for clean up of the redep is preferred, however, this can range from 65° to 85° to the sidewalls of the pole tip element PT2. It should be noted that during the cutting operation the thickness of the pole tip element PT2 has been reduced by the additional thickness added (see FIG. 17), such as 2 $\mu$m. The surprising result is that after this milling, the sidewalls of the pedestal pole tip PT1b are aligned with the sidewalls of the pole tip element PT2. The pedestal pole tip PT1b has been formed by notching at 78 and 79 into the second shield layer S2. The gap layer G can either be ion milled by the 30° and 75° beams or alternatively can be chemically etched to its width prior to the ion beam milling.

Figure 20:
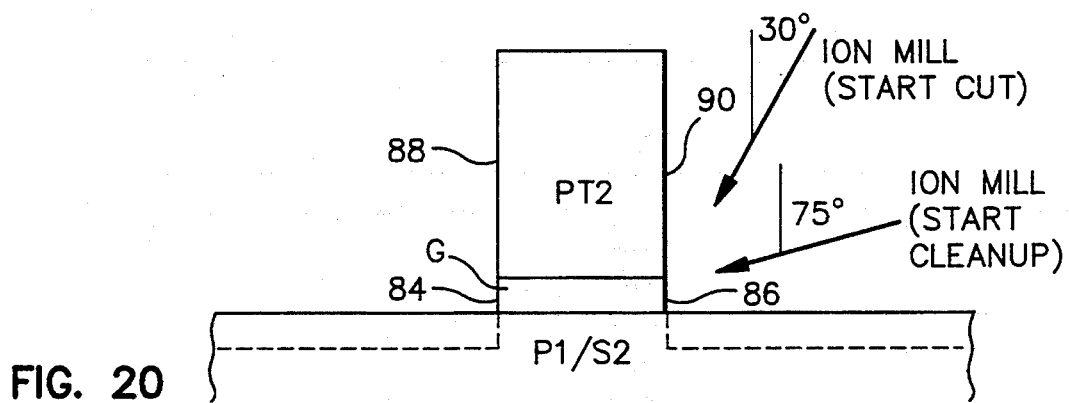
FIG. 20 is similar to FIG. 17 except the ion beam for cutting and the ion beam for clean up are directed simultaneously rather than sequentially, as shown in the FIGS. 17-19 processes.
Figure 21:
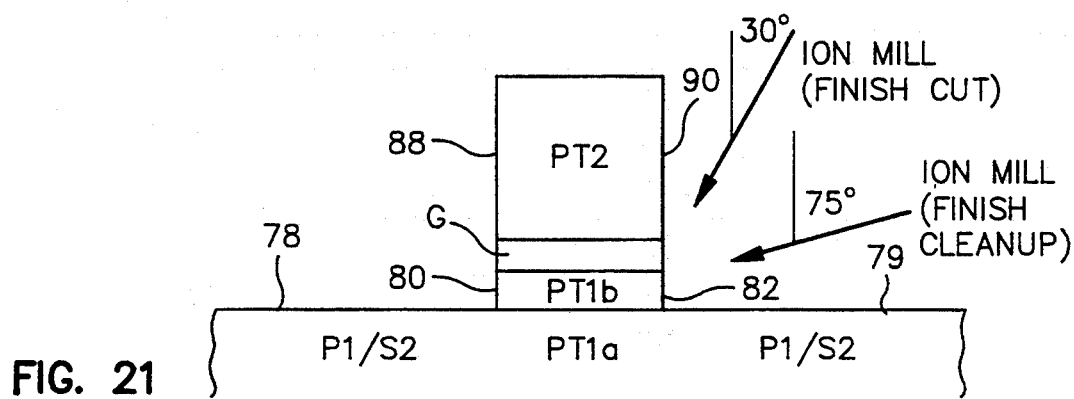
FIG. 21 is the same FIG. 20 except the notching has been completed to form the pedestal pole tip PT1$b$.

FIGS. 20 and 21 show an embodiment of the ion beam milling which is similar to the FIGS. 17, 18, and 19 embodiment except the 30° and 75° beams are directed simultaneously to perform the cutting and clean up operations.

Figure 22:
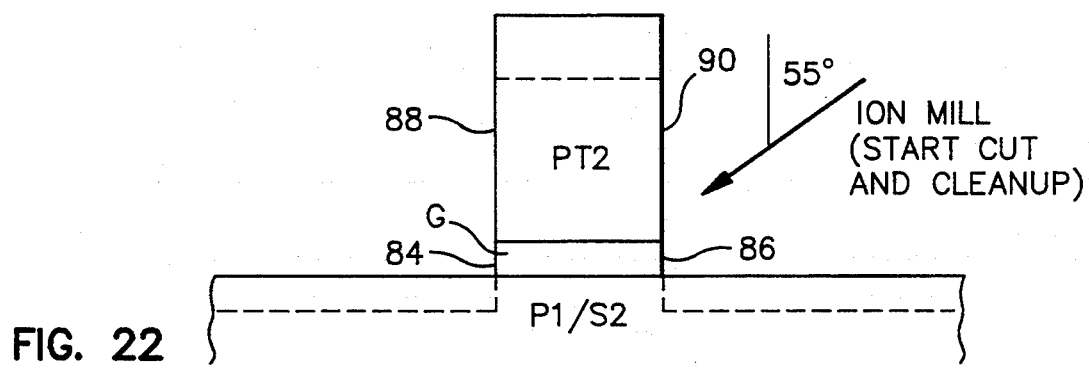
FIG. 22 is similar to FIG. 17 except a single ion beam of a greater angle is utilized for both cutting and clean up.
Figure 23:
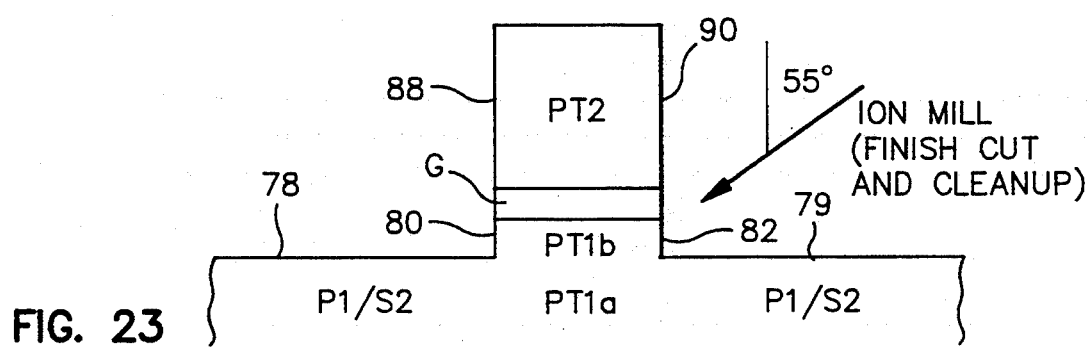
FIG. 23 is similar to FIG. 22 except the cutting and clean up operation has been completed to form the pedestal pole tip PT1$b$.

FIGS. 22 and 23 illustrate an embodiment of the ion beam milling where a single ion beam is utilized for both cutting and clean up to define the pole tip pedestal PT1b. The previously described two-angle beam approach is preferred over the single beam. However, satisfactory results can be obtained with the single beam. The preferred angle for a single beam is 55°, however, it can vary from 45° to 65° as an acceptable range.

Figure 24:
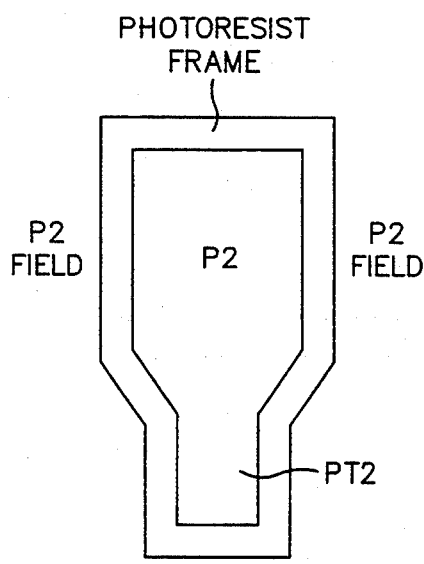
FIG. 24 is a schematic top planar illustration of the step for forming the pole tip PT2 with vertical sidewalls.
Figure 25:
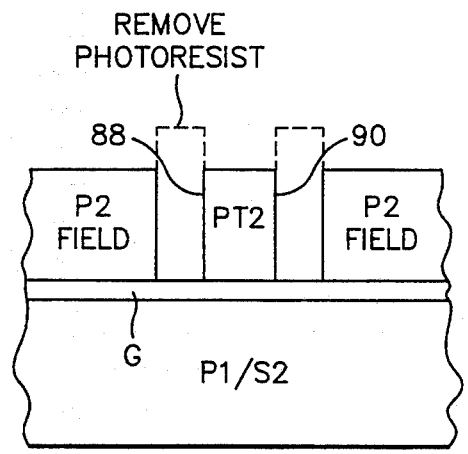
FIG. 25 is an ABS view through the structure in FIG. 24 with the photoresist frame removed.
Figure 26:
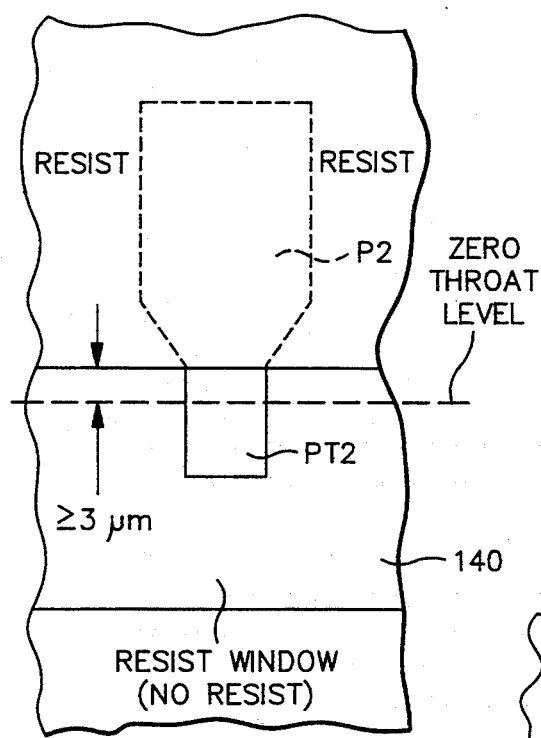
FIG. 26 is a top planar view with the top pole piece P2 masked leaving the pole tip PT2 exposed.
Figure 27:
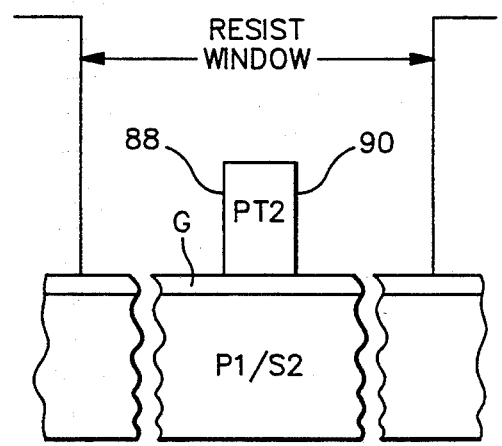
FIG. 27 is an ABS view of the structure illustrated in FIG. 26 showing a resist window or opening about the pole tip PT2 so that one or more ion beams can be directed at an angle therein.
Figure 28:
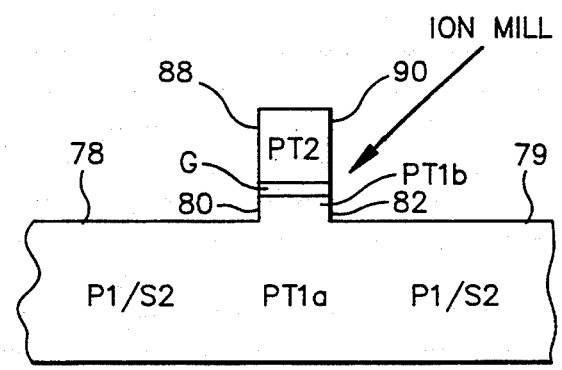
FIG. 28 is the resulting pole tip structure after ion beam milling at an angle to the sidewalls of the pole tip PT2 thus forming the pedestal pole tip PT1$b$.
Figure 32:
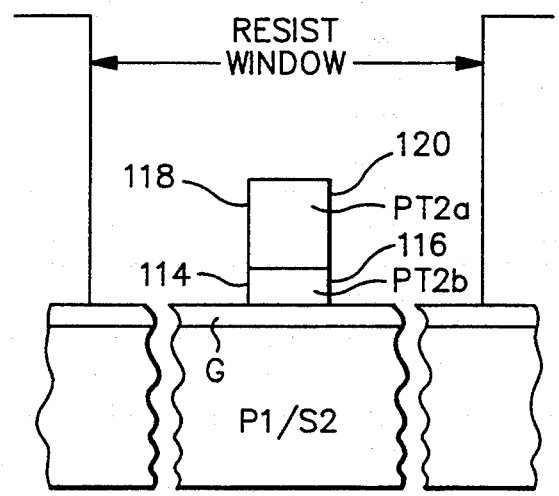

FIGS. 24 through 28 illustrate additional details in constructing the pole tip elements for the FIGS. 5 and 6 embodiment of the present invention. In FIG. 24, a photoresist frame is utilized for plating the top pole piece P2 and its pole tip portion PT2. The plating operation also plates outside the frame, which is called the P2 field. In FIG. 25, the photoresist frame has been removed, leaving the pole tip PT2 with a P2 field on each side thereof. In FIG. 25 it can be seen that the gap layer G was deposited on top of the P1/S2 layer and the pole tip element PT2 was deposited on top of the gap layer G. With the frame plating process the pole tip element PT2 will be inherently constructed with vertically oriented sidewalls 88 and 90. In FIG. 26 the P2 field has been removed and a photoresist mask has been placed on top of the P2 pole piece with an opening or window 140 exposing the pole tip element PT2. The resist window is illustrated more clearly in FIG. 27. One or more ion beams, as discussed hereinabove, are then directed through the resist window, as illustrated in FIG. 28, to notch the P1/S2 layer to provide the pedestal pole tip element PT1b.

Figure 33:
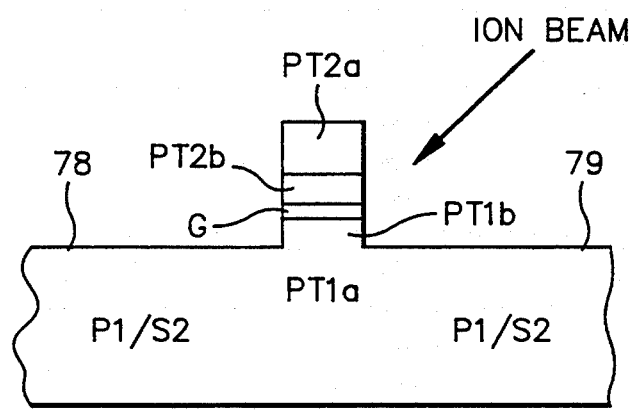
Figure 34:
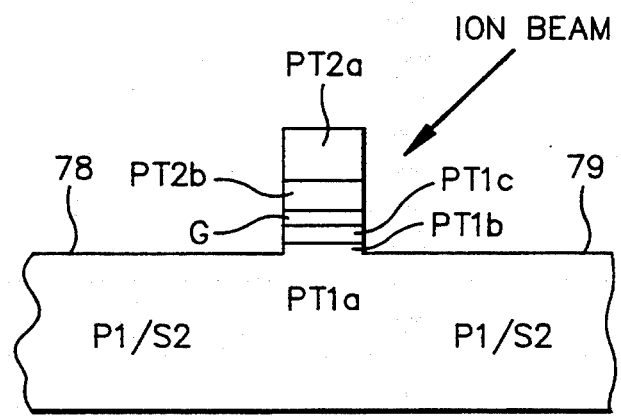
FIG. 34 is similar to FIG. 33, except additional layers PT1$c$ and PT2$b$ are deposited to obtain different materials than the remainder of the pole tips further away from the gap G.

FIGS. 29 through 33 illustrate process steps for making the pole tip structure of the FIGS. 7 and 8 embodiment of the present invention. These steps are the same as that explained for FIGS. 24 through 28 except the top pole piece P2 is constructed with two layers so as to provide two pole tip elements PT2a and PT2b, as illustrated in FIG. 30. After ion beam milling, as illustrated in FIG. 33, a pedestal pole tip element PT1b is formed and the top pole tip structure comprises pole tip elements PT2a and PT2b. As stated hereinabove, the pole tip element PT2b can be of a different material than the pole tip element PT2a. FIG. 34 illustrates an additional embodiment if a magnetic layer is laid on top of the second shield layer S2 prior to the ion beam milling. In this case, the bottom pole tip structure would comprise two pedestal pole tip elements, namely pole tip element PT1b and PT1c. Again, the pole tip element PT1c can be of a different material than the pole tip element PT1b. The pole tip elements PT2b and PT1c can be of a high moment of saturation material, ($4\pi m_s$), such as ferric nitride, and the material for the pole tip elements PT1b and PT2a can be a lower moment of saturation material, such as Permalloy. The high saturation material will allow a large amount of flux to flow through the pole tips closest to the gap layer G without saturation.

It is now readily apparent that the method of making the merged MR head broadly includes the following steps: depositing the second shield layer S2 of the read head from the ABS to and including the back gap so that the S2 layer has a pole tip portion between the ABS and the zero throat level and a back portion between the zero throat level and the back gap (see FIGS. 5 and 6); depositing the gap layer G on top of the second shield layer S2 from the ABS to the zero throat level (see FIGS. 5 and 6); depositing a magnetic layer on top of the gap layer G and the second shield layer S2 to form the top pole piece P2 with a pole tip element PT2 on top of the gap layer G (see FIGS. 24 and 25); and directing at least one ion beam at the pole tip portion of the second shield layer S2 in a direction which is substantially parallel to the ABS and at an angle to the first and second sidewalls 88 and 90 of the pole tip element PT2 using the pole tip element PT2 as a mask to notch the S2 layer at 78 and 79 on each side of the pole tip element PT2, the notches leaving the second shield layer S2 with a pedestal, the pedestal being the pole tip layer PT1 b, and the second shield layer S2, less the pedestal pole tip element PT1b, between the ABS and the zero throat level being the pole tip element PT1a (see FIGS. 17 through 19), the first sidewalls 80 and 88 of the pole tips PTb and PT2 being aligned in the first vertical plane 100 and the second sidewalls 82 and 90 of the pole tips PT1b and PT2 being aligned in the second vertical plane 102, the first and second vertical planes 100 and 102 being spaced from one another at the ABS to define the track width w of the merged MR head (see FIG. 6). The step of directing at least one ion beam may comprise first and second ion beams, the first ion beam being at an angle $\theta$ in the range of $0° < \theta < 60°$ and the second ion beam being at an angle $\theta$ in the range of $60° \leq \theta \leq 85°$. The step of depositing the gap layer G may include providing the gap layer with a thickness that defines a length g in the range of 0.1 μm to 0.7 μm with the length of the pole tip element PT1b at the ABS being in the range of 0.5 g to 3.0 g. The step of directing at least one ion beam may include notching the second shield layer S2 at 78 and 79 so that each notch is approximately 0.7 μm deep thereby providing the pole tip element PT1b with a length of approximately 0.7 μm; and the step of directing at least one ion beam including reducing the layer thickness of the pole tip element PT2 approximately 2 μm.

It is now readily apparent that the aforementioned discoveries allow a merged MR head to have vertically aligned pole tips adjacent the gap layer with the bottom pole tip element being a pedestal with respect to a second shield layer S2 of a merged MR read head. The vertical alignment of the sidewalls optimizes the minimizing of sidewriting between the pole tips.

Clearly, other embodiments and modifications of this invention will occur readily to those ordinarily skilled in the art of these teachings. Therefore, this invention is to be limited only by the following claims, which include all of such embodiments and modifications when viewed in conjunction with the above specification and accompanying drawing.

We claim:

1. A method of making a merged MR head which has a top and a bottom, the top and bottom of the merged MR head being bounded in part by an air bearing surface (ABS), the method comprising the steps of:

depositing at least one magnetic layer to form a second shield layer S2 of an MR head and a bottom pole piece P1 which extends from an air bearing surface (ABS) to and including a back gap, the bottom pole piece P1 having an undefined pole tip portion which extends between the ABS and a zero throat level;

depositing another magnetic layer to form a top pole piece P2 above the bottom pole piece P1 from the ABS to and including the back gap, the top pole piece P2 being formed with a defined pole tip element PT2 which extends between the ABS and the zero throat level and which has first and second vertical sidewalls; and directing at least one ion beam at the undefined pole tip portion of the bottom pole piece P1 at an angle $\theta$ to the sidewalls of the defined pole tip element PT2; using the defined pole tip element PT2 as a mask, to vertically notch the bottom pole piece P1 on each side of the pole tip element PT2 to form the bottom pole piece P1 into pole tip elements PT1a and PT1b, the pole tip element PT1b being a pedestal with respect to bottom pole piece P1 and having first and second vertical sidewalls which are aligned with the first and second vertical sidewalls respectively of the pole tip element PT2.

2. A method as claimed in claim 1 including:

before the step of directing at least one ion beam at the undefined pole tip portion of the bottom pole piece P1, depositing a photoresist mask on top of the top pole piece P2;

providing an opening in the photoresist mask which exposes the defined pole tip element PT2 and an area on each side thereof so that the defined pole tip element PT2 can act as a mask for the step of directing at least one ion beam at the undefined pole tip portion of the bottom pole piece P1.

3. A method as claimed in claim 1 including:

before the step of depositing said another magnetic layer, depositing a gap layer G on top of said at least one magnetic layer to cover the undefined pole tip portion of the bottom pole piece P1;

the step of directing at least one ion beam including directing the ion beam at the gap layer G before directing the ion beam at the undefined pole tip portion of the bottom pole piece P1; and the step of directing at least one ion beam providing the gap layer G with first and second vertical sidewalls which are aligned with respective first and second vertical sidewalls of the pole tip elements PT1$b$ and PT2.

4. A method as claimed in claim 1 including:

before the step of depositing said another magnetic layer, depositing a gap layer G on top of said at least one magnetic layer to cover the undefined pole tip portion of the bottom pole piece P1;

the step of depositing the gap layer G providing the gap layer with a thickness g in the range of 0.1 $\mu$m to 0.7 $\mu$m. at the ABS; and the length of the pole tip element PT1$b$ at the ABS being substantially 2.0 g.

5. A method as claimed in claim 1 including:

the step directing at least one ion beam consisting of directing a single ion beam at a single angle $\theta$.

6. A method as claimed in claim 1 including:

the step of directing at least one ion beam comprising directing first and second ion beams;

the first ion beam being at an angle $\theta$ in the range of $0° < \theta < 60°$; and the second ion beam being at an angle $\theta$ in the range of $60° < \theta < 85°$.

7. A method as claimed in claim 6 including:

the first ion beam being at an angle $\theta$ in the range of $20° < \theta < 40°$.

8. A method as claimed in claim 7 including:

the first ion beam being at an angle $\theta$ of substantially 30°; and the second ion beam being at an angle $\theta$ of substantially 75°.

9. A method as claimed in claim 1 including:

the step of directing at least one ion beam reducing the thickness of the pole tip layer PT2; and the step of depositing the pole tip element PT2 including depositing the pole tip layer PT2 with an additional thickness, the additional thickness being the reduction of thickness of the pole tip element PT2 caused by the step of directing at least one ion beam.

10. A method as claimed in claim 9 including:

before the step of directing at least one ion beam, depositing a mask over the pole piece P2 layer between substantially the zero throat level and the back gap leaving a window in the mask between the ABS and the zero throat level to expose the defined pole tip element PT2 and an area on each side thereof.

11. A method as claimed in claim 10 including:

the step directing at least one ion beam consisting of directing a single ion beam at a single angle $\theta$; and the angle $\theta$ being in the range of $0° < \theta < 60°$.

12. A method as claimed in claim 10 including:

the step of directing at least one ion beam comprising directing first and second ion beams;

the first ion beam being at an angle $\theta$ in the range of $20° < \theta < 40°$; and the second ion beam being at an angle $\theta$ in the range of $65° < \theta < 85°$.

13. A method as claimed in claim 12 including:

the first ion beam being at an angle $\theta$ of substantially 30°; and the second ion beam being at an angle $\theta$ of substantially 75°.

14. A method as claimed in claim 13 including:

before the step of depositing said another magnetic layer, depositing a gap layer G on top of said at least one magnetic layer to cover the undefined pole tip portion of the bottom pole piece P1;

the step of depositing the gap layer G providing a layer thickness that provides the gap G with a length g at the ABS; and the length of the pole tip element PT1$b$ at the ABS being substantially 2.0 g.

15. A method as claimed in claim 14 including:

the first and second ion beams being directed simultaneously.

16. A method as claimed in claim 14 including:

the first and second ion beams being directed sequentially.

17. A method as claimed in claim 16 including:

the step of directing at least one ion beam including placing the bottom pole piece P1 with the layers deposited thereon in an ion beam milling chamber and rotating the bottom pole piece P1 and the layers deposited thereon at a constant rpm while directing the ion beam at the bottom pole piece P1 and the layers deposited thereon.

18. A method as claimed in claim 17 including:

the step of depositing the gap layer G including providing the gap layer G with a length g in a range of 0.1 $\mu$m to 0.7 $\mu$m;

the step of depositing said another magnetic layer including depositing the pole tip element PT2 with a layer thickness of approximately 7 $\mu$m;

the step of directing at least one ion beam including notching the bottom pole piece P1 so that each notch is approximately 0.7 $\mu$m deep and the pedestal has a height of approximately 0.7 $\mu$m; and the step of directing at least one ion beam reducing the thickness of the pole tip element PT2 approximately 2 $\mu$m.

19. A method of making a merged MR head which includes an MR read head and a write head, the MR read head including first and second shield layers S1 and S2, first and second gap layers G1 and G2 sandwiched between the first and second shield layers S1 and S2 and an MR element sandwiched between the first and second gap layers G1 and G2, and the write head including bottom and top pole pieces P1 and P2 which extend from an air bearing surface (ABS) to and including a back gap, the bottom pole piece P1 comprising the second shield layer S2, the bottom pole piece P1 having pole tip elements PT1$a$ and PT1$b$ which extend between the ABS and a zero throat level and the top pole piece P2 having a pole tip element PT2 which extends between the ABS and the zero throat level, the pole tip element PT1b being a pedestal with respect to the second shield layer S2, the bottom pole P1 and the pole tip element PT1a, the second shield layer S2 comprising the pole tip elements PT1a and PT1b, a gap layer G sandwiched between the pole tip elements PT1b and PT2, and each of the pole tip element PT2, the gap layer G and the pole tip element PT1b having first and second vertical sidewalls, the first vertical sidewalls of the pole tip element PT2, the gap layer G and the pole tip element PT1b lying contiguously in a first vertical plane and the second vertical sidewalls of the pole tip element PT2, the gap layer G and the pole tip element PT1b lying contiguously in a second vertical plane, the first and second vertical planes being perpendicular to the ABS and spaced from one another at the ABS by a distance w to define the track width of the merged MR head, the method of making comprising:
  depositing a first magnetic layer from the ABS to and including the back gap to form:
    (1) the second shield layer S2 of the MR read head and
    (2) the bottom pole P1 with an undefined pole tip portion between the ABS and the zero throat level and a back portion between the zero throat level and the back gap;
  depositing the gap layer G on top of the first magnetic layer from the ABS to the zero throat level;
  depositing a second magnetic layer on top of the gap layer G and above the first magnetic layer to form the top pole piece P2 with a defined pole tip element PT2 which has first and second vertical sidewalls; and
  directing at least one ion beam at the first magnetic layer in an area of the undefined pole tip portion of the bottom pole P1 in a direction which is substantially parallel to the ABS and at an angle $\theta$ to the first and second vertical sidewalls of the pole tip element PT2 using the pole tip element PT2 as a mask to notch the first magnetic layer on each side of the pole tip element PT2, the notches leaving the first magnetic layer with a vertical pedestal, the vertical pedestal being the pole tip element PT1b and providing the pole tip element PT1b with first and second vertical sidewalls, and the magnetic layer, less the pedestal, between the ABS and the zero throat level comprising the pole tip element PT1a, the first vertical sidewalls of the pole tip elements PT1b and PT2 being aligned in a first vertical plane and the second sidewalls of the pole tips PT1b and PT2 being aligned in a second vertical plane, the first and second vertical planes being perpendicular to the ABS and spaced from one another at the ABS to define the track width w of the merged MR head.

20. A method as claimed in claim 19 including:
the step of directing at least one ion beam including directing the ion beam at the gap layer G before directing the ion beam at the undefined pole tip portion; and
the step of directing at least one ion beam providing the gap layer G with first and second vertical sidewalls which are aligned with respective first and second vertical sidewalls of the pole tip elements PT1b and PT2.

21. A method as claimed in claim 19 including:
the step of directing one ion beam comprising directing first and second ion beams;
the first ion beam being at an angle $\theta$ in the range of $20° < \theta < 40°$; and
the second ion beam being at an angle $\theta$ in the range of $65° < \theta < 85°$.

22. A method as claimed in claim 21 including:
the step of directing the first and second ion beams reducing the thickness of the pole tip element PT2; and
the step of depositing the magnetic layer to form the pole tip element PT2 including depositing the pole tip element PT2 with an additional thickness, the additional thickness being the reduction of thickness of the pole tip element PT2 caused by the step of directing at least one ion beam; and
before the step of directing the first and second ion beams, depositing a mask over the top pole piece P2 substantially between the zero throat level and the back gap leaving a window in the mask between the ABS and the zero throat level to expose the defined pole tip element PT2 and an area on each side thereof.

23. A method as claimed in claim 22 including:
the step of depositing the gap layer G providing a layer thickness that provides the gap G with a length g at the ABS; and
the length of the pole tip element PT1b at the ABS being in the range of 0.5 g to 3.0 g.

24. A method as claimed in claim 23 including:
the first ion beam being at an angle $\theta$ of approximately 30°; and
the second ion beam being at an angle $\theta$ of approximately 75°.

25. A method as claimed in claim 24 including:
the step of depositing the gap layer G including depositing a gap layer G with a thickness g in the range of 0.1 $\mu$m to 0.7 $\mu$m;
the step of depositing the pole tip element PT2 including depositing the pole tip element PT2 with a layer thickness of approximately 7 $\mu$m;
the step of directing the first and second ion beams including notching the first magnetic layer with a depth which is approximately 0.7 $\mu$m deep thereby providing the pedestal with a height of approximately 0.7 $\mu$m; and
the step of directing the first and second ion beams reducing the layer thickness of the pole tip element PT2 approximately 2 $\mu$m.

26. A method as claimed in claim 25 including:
the step of directing the first and second ion beams including placing the first magnetic layer with the layers deposited thereon in an ion beam milling chamber and rotating the first magnetic layer and the layers deposited thereon at a constant rpm while directing the ion beam at the first magnetic layer and the layers deposited thereon.

27. A method as claimed in claim 26 including:
the first and second ion beams being directed simultaneously.

28. A method as claimed in 26 including:
the first and second ion beams being directed sequentially.

* * * * *

UNITED STATES PATENT AND TRADEMARK OFFICE
CERTIFICATE OF CORRECTION

PATENT NO.  : 5,438,747
DATED       : August 8, 1995
INVENTOR(S) : Krounbi et al It is certified that error appears in the above-indentified patent and that said Letters Patent is hereby corrected as shown below:

Col. 14, line 57, ";" should be --,--.

Col. 15, line 32, "2.0 g" should be --2.0g--

Col. 16, line 25, "2.0 g" should be --2.0g--

Col. 17, lines 23-26, "(2) the bottom ... and the back gap;" should be a sub-sub paragraph Col. 18, line 30, "0.5 g to 3.0 g" should be --0.5g to 3.0g--.

Signed and Sealed this

Thirtieth Day of January, 1996

Attest:

BRUCE LEHMAN

*Attesting Officer*   *Commissioner of Patents and Trademarks*